United States Patent [19]

Asioli

[11] 4,016,897

[45] Apr. 12, 1977

[54] PRESSURE AND FLOW-REGULATING VALVE FOR AUTOMATIC OR SEMIAUTOMATIC-CYCLE LUBRICATING SYSTEM

[76] Inventor: Zeo Asioli, Via Fosdondo, 54, Correggio, Italy

[22] Filed: Feb. 6, 1976

[21] Appl. No.: 656,073

[30] Foreign Application Priority Data

Feb. 10, 1975 Italy .................. 42506/75

[52] U.S. Cl. .................... 137/107; 137/116.3; 91/442
[51] Int. Cl.² .................................. G05D 7/01
[58] Field of Search ............. 137/107, 102, 116.3; 91/442

[56] References Cited

UNITED STATES PATENTS

| | | | |
|---|---|---|---|
| 795,134 | 7/1905 | Jones | 91/442 |
| 1,441,759 | 1/1923 | Schwennker | 91/442 |
| 1,595,074 | 8/1926 | Crews | 137/107 |
| 1,726,102 | 8/1929 | Forman | 91/442 |
| 2,643,739 | 6/1953 | Tear | 137/107 |
| 2,670,751 | 3/1954 | Wilson | 137/107 |
| 3,419,030 | 12/1968 | Gratzmuller | 137/102 |
| 3,474,816 | 10/1969 | Burgess | 137/107 |
| 3,827,451 | 8/1974 | Roob | 137/102 |

FOREIGN PATENTS OR APPLICATIONS 535,369   4/1941   United Kingdom .............. 137/107

*Primary Examiner*—William R. Cline
*Assistant Examiner*—H. Jay Spiegel
*Attorney, Agent, or Firm*—Browdy and Neimark

[57] ABSTRACT

Pressure- and flow-regulating valve for automatic- or semiautomatic-cycle lubricating systems, principally characterized by being provided with a longitudinal bore subdivided into three aligned sections: in the intermediate section whereof there is coupled, with guided axial sliding, a piston element whose straight section has an area smaller than that of the intermediate bore section so as to permit oil to flow between the piston and the wall of the intermediate bore section; by the lower end of the piston terminating in an axial rod whose diameter is smaller than that of the piston to permit insertion of a coil spring around said rod; there being provided that the rod terminates in a spherical cap, intended to plug the last section of the longitudinal bore communicating with oil discharge when oil flows toward lubrication circuit and to re-open it when oil flow is interrupted.

4 Claims, 1 Drawing Figure

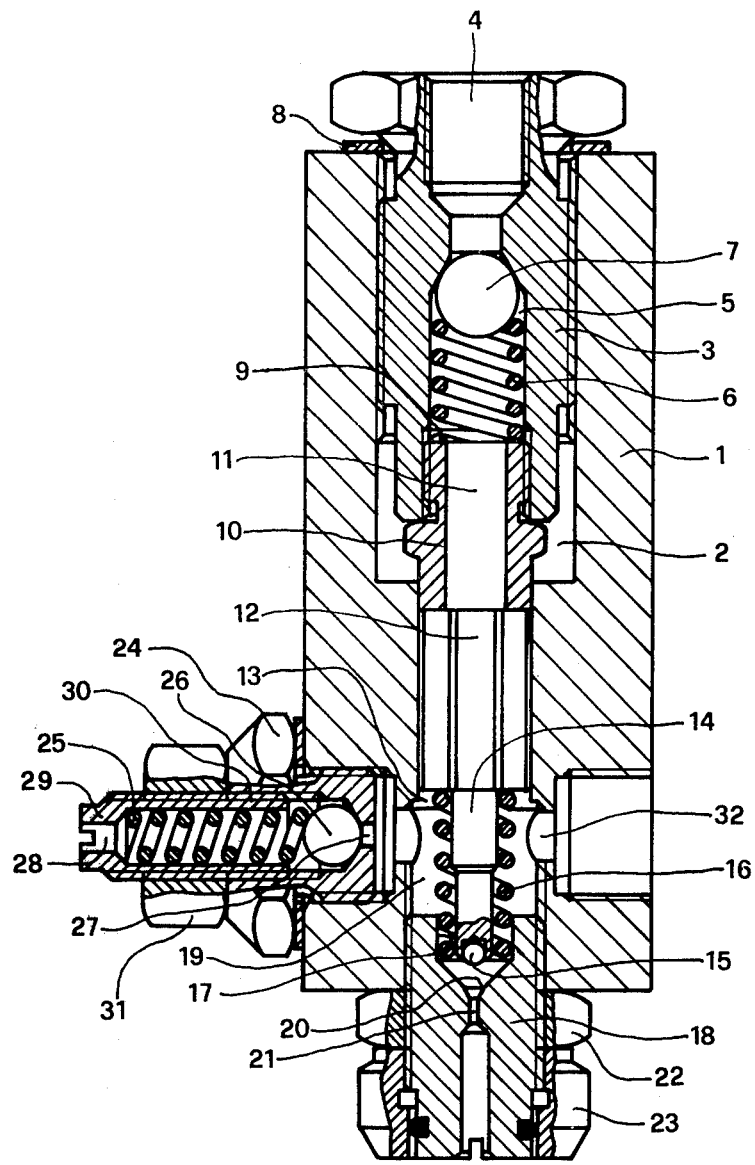

PRESSURE AND FLOW-REGULATING VALVE FOR AUTOMATIC OR SEMIAUTOMATIC-CYCLE LUBRICATING SYSTEM

FIELD OF INVENTION

The present invention relates to a valve to be interposed between the pump and the lubricating circuit of for example industrial motor vehicles, machine tools, and machines and systems in general.

BACKGROUND OF THE INVENTION

The state of the present art prior to the present invention is distinguished by valves wherein the closure and opening of the oil return line from the lubricating circuit of the machine to the feed tank is achieved by axial displacement of a rubber stopper which permits the oil to travel only upstream-to-downstream and not in the reverse direction. Each of these prior valves is generally applicable to a single type of system with preset pressure and does not permit smooth starting of the pump.

This prior state-of-the-art has some deficiencies and disadvantages deriving from the fact that these rubber elements, aside from being occasionally subject to attack and deterioration by the oil, are also subject to wear and permanent deformation and to breakage in the location — itself subject to high stresses sometimes of the alternating type — intended for closure of the oil return line to the tank. Moreover, the traditional valves are not provided with regulating means for oil return to the tank, thus causing an overload on the pump when it is started and sometimes preventing zeroing of the pressure in the lubricating circuit when feed ceases to achieve the necessary return to the initial position of the dispensing valves operating at various points in the circuit. Finally, the conventional oil circuit valves are provided with auxiliary valve elements to permit opening of the oil return line to the tank by the traditional plugs being pushed by a spring toward such line.

such deficiencies and disadvantages dictate the need for a solution to the new technical problem of finding a valve wherein the closing element of the oil return line enables high loads to be tolerated with no damage, ensuring relatively perfect retention of the oil even at low pressure.

SUMMARY

It is accordingly, an object of the present invention to overcome the deficiencies and disadvantages of the prior art, such as indicated above; it is another object to provide for improved oil flow control; it is further object to provide an improved oil valve; it is yet another object to provide such a valve wherein the closing element of the oil return line enables high loads to be tolerated with no damage, ensuring excellent retention of the oil even at low pressure; moreover, it is an object of the present invention to provide such a valve which can be applied to various machines with various oil viscosities, circuits, strokes, and pressure characteristics and wherein the return line opens without the use of auxiliary means and all this in a simple, economical manner without need of maintenance and with smooth pump startup.

BRIEF DESCRIPTION OF THE DRAWINGS

One embodiment of the invention is illustrated, purely for indicative purposes, in the schematic drawing attached which represents the axial section of the valve illustratively described.

DETAILED DESCRIPTION OF THE PREFERRED EMBODIMENT

An oil valve in accordance with the present invention has a valve body 1 with a cylindrical cavity 2, constituting the first section of its longitudinal bore. An insert 3, having an internal bore, is screwed down into the cavity 2 and has an inlet 4 for attachement to the oil feed line (not shown) for receiving pressurized lubricating oil from the pump (not shown). The bore of the insert element 3 widens from a neck portion downstream of the inlet 4 to form a cavity 5 which accommodates a preloaded coil spring 6 which pushes a ball 7 to block the neck portion downstream of the inlet 4 thereby preventing lubricant from returning to the pump when the latter is stopped; this ensures that the pump can subsequently start without overloading.

A lock washer 8 is provided above the insert element 3 while a tubular insert element 10 is fixed to its lower part, the top of the element 10 serving as a shoulder 9 to support the spring 6. The tubular element 10 has a central hole 11 for the return flow of the oil. Located beneath the element 10 is a piston 12 having a straight hexagonal section with rounded edges to constitute a sliding guide inside a cylindrical hole 13 constituting the intermediate section of the longitudinal bore of the valve body 1 into which the tubular element 10 penetrates, with the lower portion of its cylindrical surface abutting the upper portion of the cylindrical hole 13, when the element 10 is in the resting position.

Located below the nexagonal piston 12 is a cylindrical axial tip or a rod 14 which constitutes an extension of the piston 12. At the end of the tip 14 is fixed a check ball 15; and a coil spring 16 within the cylindrical hole 13 surrounds the tip 14, resting between the lower surface of the piston 12 and the base of a cavity 17 provided in a plug 18 which is located at the bottom of the valve body 1. The plug 18 is axially adjustable to permit the regulation of the closing stroke of the piston 12 as a function of the viscosity of the oil and the time necessary to reduce the pressure to zero. It will be understood that the plug 18 is screwed into the distribution chamber 19 which is part of the last section of the longitudinal bore of the valve body 1 or the section conventionally called the "lower" section, this portion being directly or indirectly immersed in the oil contained in the tank (not shown) into which the pump dips. The check ball 15 fits into a seat 20 in the oil return bore 21 of the plug 18 to seal such oil return hole 21 to the oil tank.

A nut 22 and locknut 23 are provided about the plug 18 for adjustment and closure. Extending radially through the valve body 1 and in communication with the chamber 19 is the body of a traditional valve 24 screwed into the valve body 1, and internally provided with a coil spring 25 and ball 26 to block a hole 27 communicating with the chamber 19. A channel 28 in the body 29 of a threaded sleeve 30 of the valve 24 is provided for adjusting the spring 25; a nut 31 surrounds the sleeve 30. A hole is provided radially opposite the valve 24 communicating with the chamber 19 to drain the oil and feed into the lubricating circuit.

Operation is as follows: when oil under pressure enters the inlet 4, the ball 7 overcomes the action of the spring 6 enabling the oil to flow into passageways 5 and 11, and lightly push the piston 12 against the action of spring 16 and then pass between the piston 12 and wall of the bore 13 to reach the chamber 19, while the ball 15, pushed by the piston 12 and the tip 14 against the action of spring 16, serves to close hole 21 by sealing against the seat 20; in this way the oil having entered through inlet 4, all flows out through the drain hole 32 to fill up the lubricating circuits. The valve 24, appropriately precalibrated by means of the sleeve 30 to keep the circuit full at pressure levels of a few atmospheres to 100 atmospheres and above, bleeds the excess oil through the hole 27 and channel 28 into the tank into which the pump dips and in which the plug 18 is immersed.

For the purpose of meeting various operating requirements and the need for different quantities of oil to supply several lubrication points of varying number, with different characteristics and with different lubrication times, the flow of oil provided through the bore (5,11,13) of the valve body 1 must be not less than the maximum provided through drain hole 32; at the end of the time interval during which the oil enters inlet 4, the ball 7 seals bore 4, ball 15 recedes from seat 20 to free opening 21, and the pressurized oil downstream of drain hole 32 flows back into chamber 19 from drain hole 32 and drains into the tank through opening 21; thus the pressure is zeroed in the circuit but the latter remains full of oil to prevent the formation of air bubbles. It is finally provided that at the moment the pump starts, when the oil flow rate is still low, the distance between the upper face of piston 12 and the lower face of element 10 is less than that needed for ball 15 to seal seat 20; this is done to permit starting the pump without overloads.

In practice the details of execution, the sizes, the materials, and the form of the invention can vary without departing from its scope; in fact the invention so conceived is susceptible of modifications and variants, all coming within the inventive scope. Thus, for example, the straight section of piston 12 may be square or another polygonal shape and yet be of a shape such that the connection between piston 12 and bore 13, whatever the shape of the straight sections of piston 12 and bore 13, permits the piston 12 to slide into the bore 13 and also oil to flow between their surfaces; for example, a circular section could be adopted for piston 12 and a grooved section for bore 13. Finally, all the elements can be replaced by other technically equivalent elements.

It will be obvious to those skilled in the art that various changes may be made without departing from the scope of the invention and the invention is not to be considered limited to what is described in the specification.

What is claimed is:

1. A pressure and flow regulating valve for use as part of an automatic or semiautomatic cycle lubricating system of motor vehicles, machine tools and machines in general by insertion in a path which conveys lubricating oil from a pump to oil dispensing valves in the lubricating system and which is adapted to communicate, directly via an extension conduit means, with oil contained in a feed tank for the pump, the valve comprising, in combination a valve body provided with an axial bore extending therethrough, having an inlet, an upstream section, an intermediate section, a downstream section and an outlet defining a drain; an insert element positioned in said upstream section of said bore and having an axial aperture therein; a first coil spring in said upstream section of said bore and having one end thereof positioned on an upstream surface of said insert element; a ball biased by said first coil spring to close and inlet for preventing return of oil coming from the pump; an oil flow regulating piston having a piston rod with an end carrying a spherical cap and a longitudinally extending section having a cross-section, whose area is smaller than said intermediate section of said axial bore slidably inserted in said intermediate section of said bore for allowing oil to flow in spaces about the periphery of said longitudinally extending section of said piston; a feeding chamber downstream of said longitudinally extending section of said oil flow regulating piston and defined by at least a portion of said downstream section of said bore for receiving oil flowing in the space about said extending section; two openings through said body, one of them for attachment of a maximum pressure regulating device which is to allow excess feed oil in every cycle to flow into the tank, the other one for attachment of conduit means which is to convey oil from the feeding chamber into the dispensing valves; a second coil spring positioned in said feeding chamber around said piston rod with one of its ends positioned against an annular downstream surface of said piston for biasing said piston towards an annular downstream surface of said insert element so as to obstruct oil flow, said second coil spring extending downstream and having a diameter smaller than that of said longitudinally extending section of said piston, an axially adjustable plug positioned in said downstream section of said bore, said second coil spring having its second end resting against a truncated-conical narrowing downstream passage of a cylindrical chamber and formed in an upstream face of said axially adjustable plug so as to create a closure seat for an axial bore which extends through said plug, and seat being positioned to receive said spherical cap on said end of said piston rod so as to permit oil to discharge into the tank via said axial bore in said plug; whereby the axial bore in said plug is of reduced diameter by virtue of the truncated-conical narrowing passage so as to permit gradual starting up of the pump at the beginning of each feed cycle, to get desired pressure in the feed conduit means to the dispensing valves and further, during each feed stop stroke of the pump, to allow slow drain of oil from the conduit means to the dispensing valves until a zeroing of oil pressure in the conduit means to the dispensing valves is attained, while keeping these conduit means full of oil in order to avoid the presence of air bubbles therein so as to make complete filling of the dispensing valves possible in the following cycle.

2. A valve according to claim 1, wherein said axially adjustable plug is screwed in said downstream section of said axial bore in said valve body wherein it can assume, by screwing and unscrewing, many different continuous axial positions whereby the valve can be adjusted according to characteristics of oil viscosity, fluidity, density, composition and compressibility, so that the valve can be used, without any construction change, in lubricating systems containing oils of different characteristics, maintaining the functionality steady by varying suitably the distance in resting position between said spherical cap and said truncated-conical seat.

3. A valve according to claim 2, further comprising, at the upstream end of said longitudinal bore in said first section thereof, a connecting element connected to said insert element for attachment to a line from the feed pump, said connecting element being provided with an axial bore communicating with said intermediate section of said longitudinal bore via said axial aperture in said insert element and said spaces about the periphery of said piston, the downstream end of said connecting element penetrating into said first portion of said longitudinal bore so that its lateral surface abuts, for a distance, that of said bore; a lower face of said insert element resting against an upper face of said piston in its resting position; whereby when the feed pump starts, said piston is pushed toward the bottom initially by an amount less than that necessary for plugging said outlet of said axial bore through which oil drains into the tank, said outlet of said axial bore being closed by further movement of said piston when flow of oil has reached a given value.

4. A valve according to claim 3, wherein said ball is positioned in said connecting element to seal said pressurized lubricant inlet and prevent backflow of oil therethrough.

* * * * *